US012754985B2

(12) United States Patent
Saito

(10) Patent No.: US 12,754,985 B2
(45) Date of Patent: Oct. 6, 2026

(54) AUTHENTICATION APPARATUS, AUTHENTICATION METHOD, AND NON-TRANSITORY COMPUTER-READABLE STORAGE MEDIUM

(71) Applicant: NEC Corporation, Tokyo (JP)

(72) Inventor: Yasuji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 313 days.

(21) Appl. No.: 18/704,184

(22) PCT Filed: Nov. 12, 2021

(86) PCT No.: PCT/JP2021/041790
§ 371 (c)(1),
(2) Date: Apr. 24, 2024

(87) PCT Pub. No.: WO2023/084753
PCT Pub. Date: May 19, 2023

(65) Prior Publication Data
US 2026/0141043 A1 May 21, 2026

(51) Int. Cl.
*G06F 21/00* (2013.01)
*G06F 21/32* (2013.01)
(Continued)

(52) U.S. Cl.
CPC ......... *G06F 21/32* (2013.01); *G07C 9/00563* (2013.01); *G07C 9/37* (2020.01)

(58) Field of Classification Search
CPC ........ G06F 21/32; G07C 9/00563; G07C 9/37
See application file for complete search history.

(56) References Cited

U.S. PATENT DOCUMENTS

2009/0091420 A1* 4/2009 Dobashi ............... G06V 40/172 340/5.2
2013/0232073 A1* 9/2013 Sheets .................. G06Q 20/389 705/44
(Continued)

FOREIGN PATENT DOCUMENTS

CN 108109250 A 6/2018
JP 2003-331323 A 11/2003
(Continued)

OTHER PUBLICATIONS

F. Alonso-Fernandez, J. Fierrez and J. Ortega-Garcia, "Quality Measures in Biometric Systems," in IEEE Security & Privacy, vol. 10, No. 6, pp. 52-62, Nov.-Dec. 2012, doi: 10.1109/MSP.2011.178. (Year: 2011).*
(Continued)

*Primary Examiner* — Ka Shan Choy
(74) *Attorney, Agent, or Firm* — Sughrue Mion, PLLC

(57) ABSTRACT

An acquisition unit (110) acquires master biological information of a target person from a mobile terminal (20), and acquires biological information for authentication generated by a biological information generation apparatus (50) installed at an entrance of a target area. An authentication unit (120) executes authentication processing for the target person, by using the biological information for authentication and the master biological information. A storage unit (150) stores the master biological information. Then, the acquisition unit (110) acquires, before acquiring the master biological information, the biological information for authentication. The authentication unit (120) executes, for the master biological information stored in the storage unit (150), authentication processing for the biological information for authentication. Then, the acquisition unit (110) acquires the master biological information from the mobile terminal (20) when the master biological information
(Continued)

matched with the biological information for authentication is not stored in the storage unit (150).

9 Claims, 9 Drawing Sheets

(51) Int. Cl.
*G07C 9/00* (2020.01)
*G07C 9/37* (2020.01)

(56) References Cited

U.S. PATENT DOCUMENTS

2017/0308694 A1* 10/2017 Belavadi ................. G06F 21/45
2020/0369243 A1* 11/2020 Owaki .................. B60R 25/255

FOREIGN PATENT DOCUMENTS

WO 2019/049623 A1 3/2019
WO 2021/193138 A1 9/2021

OTHER PUBLICATIONS

International Search Report for PCT Application No. PCT/JP2021/041790, mailed on Feb. 8, 2022.

* cited by examiner

FIG. 3

150

| IDENTIFICATION INFORMATION FOR AUTHENTICATION | MASTER BIOLOGICAL INFORMATION |
|---|---|
| 001 | ··· |
| 002 | ··· |
| ⋮ | ⋮ |

FIG. 4

150

| AREA IDENTIFICATION INFORMATION | AUTHORIZED IDENTIFICATION INFORMATION |
| --- | --- |
| FIRST BUILDING | 001<br>002<br>003 |
| SECOND BUILDING | 001<br>004<br>005 |

AUTHENTICATION APPARATUS, AUTHENTICATION METHOD, AND NON-TRANSITORY COMPUTER-READABLE STORAGE MEDIUM

This application is a National Stage Entry of PCT/JP2021/041790 filed on Nov. 12, 2021, the contents of all of which are incorporated herein by reference, in their entirety.

TECHNICAL FIELD

The present invention relates to an authentication apparatus, an authentication method, and a program.

BACKGROUND ART

In recent years, in various scenes, biological authentication is used. Patent Document 1, for example, describes the following technique. First, a portable user apparatus stores passage authority data necessary for a user to pass through a gate and feature data indicating a feature of a user. One example of the feature data is face data relating to a feature of a face. A passability determination unit acquires, via a wireless communication unit, passage authority data and feature data from the user apparatus. Further, the passability determination unit acquires a video of a user about to pass through a gate. Then, the passability determination unit opens the gate when the passage authority data are valid and the video of the user is matched with the feature data acquired from the user apparatus.

Note that, Patent Document 2 describes that a location of a wireless communication terminal is measured, and, based on the location, passability through a gate by the wireless communication terminal is determined.

RELATED DOCUMENTS

Patent Documents

Patent Document 1: Japanese Patent Application Publication No. 2003-331323

Patent Document 2: International Patent Publication No. WO2019/049623

SUMMARY OF INVENTION

Technical Problem

In the technique described in Patent Document 1, a mobile terminal needs to transmit, every time a user tries to pass through a gate and the like, biological information to be a master to an authentication apparatus. In this case, convenience of a user may decrease.

One example of an object of the present invention is to reduce, when a user is authenticated by using master biological information stored in a mobile terminal, the number of transmissions of master biological information from the mobile terminal.

Solution to Problem

According to one aspect of the present invention, provided is an authentication apparatus including:

an acquisition unit that acquires master biological information of a target person from a mobile terminal, and acquires biological information for authentication being biological information of the target person generated by a biological information generation apparatus installed at an entrance of a target area;

an authentication unit that executes authentication processing for the target person, by using the biological information for authentication and the master biological information;

an entry processing unit that executes, when the authentication processing is successful, at least a part of processing for enabling the target person to enter a target area; and a storage processing unit that causes, when the authentication processing is successful, a storage unit to store the master biological information, and also invalidates or deletes, from the storage unit, the master biological information in which a time of being stored in the storage unit is equal to or more than a predetermined time, wherein the acquisition unit acquires, before acquiring the master biological information from the mobile terminal, the biological information for authentication, the authentication unit executes, for the valid master biological information stored in the storage unit, authentication processing for the biological information for authentication, and the acquisition unit acquires the master biological information from the mobile terminal when the master biological information which is matched with the biological information for authentication and is valid is not stored in the storage unit.

According to one aspect of the present invention, provided is an authentication method including, by a computer executing:

acquisition processing of acquiring master biological information of a target person from a mobile terminal, and acquiring biological information for authentication being biological information of the target person generated by a biological information generation apparatus installed at an entrance of a target area;

authentication processing of executing authentication of the target person, by using the biological information for authentication and the master biological information;

entry processing of executing, when the authentication processing is successful, at least a part of processing for enabling the target person to enter a target area; and storage processing of causing, when the authentication processing is successful, a storage unit to store the master biological information, and also invalidating or deleting, from the storage unit, the master biological information in which a time of being stored in the storage unit is equal to or more than a predetermined time, the authentication method further including, by the computer:

in the acquisition processing, acquiring, before acquiring the master biological information from the mobile terminal, the biological information for authentication;

in the authentication processing, authenticating, for the valid master biological information stored in the storage unit, the biological information for authentication; and in the acquisition processing, acquiring the master biological information from the mobile terminal when the master biological information which is matched with the biological information for authentication and is valid is not stored in the storage unit.

According to one aspect of the present invention, provided is a program for causing a computer to include:

an acquisition function of acquiring master biological information of a target person from a mobile terminal, and acquiring biological information for authentication being biological information of the target person generated by a biological information generation apparatus installed at an entrance of a target area;

an authentication function of executing authentication processing for the target person, by using the biological information for authentication and the master biological information;

an entry processing function of executing, when the authentication processing is successful, at least a part of processing for enabling the target person to enter a target area; and a storage processing function of causing, when the authentication processing is successful, a storage unit to store the master biological information, and also invalidating or deleting, from the storage unit, the master biological information in which a time of being stored in the storage unit is equal to or more than a predetermined time, wherein the acquisition function acquires, before acquiring the master biological information from the mobile terminal, the biological information for authentication, the authentication function executes, for the valid master biological information stored in the storage unit, authentication processing for the biological information for authentication, and the acquisition function acquires the master biological information from the mobile terminal when the master biological information which is matched with the biological information for authentication and is valid is not stored in the storage unit.

Advantageous Effects of Invention

According to one aspect of the present invention, when a user is authenticated by using master biological information stored in a mobile terminal, the number of transmissions of master biological information from the mobile terminal is reduced.

BRIEF DESCRIPTION OF THE DRAWINGS

The above-described object, other objects, features, and advantages will become more apparent from preferred example embodiments described below and the following accompanying drawings.

FIG. 3 It is a diagram illustrating a first example of information stored by a storage unit.

FIG. 4 It is a diagram illustrating a second example of information stored by the storage unit.

EXAMPLE EMBODIMENT

Hereinafter, example embodiments according to the present invention are described by using the accompanying drawings. Note that in all drawings, a similar component is assigned with a similar reference sign, and description thereof is not included as appropriate.

First Example Embodiment

Figure 1:
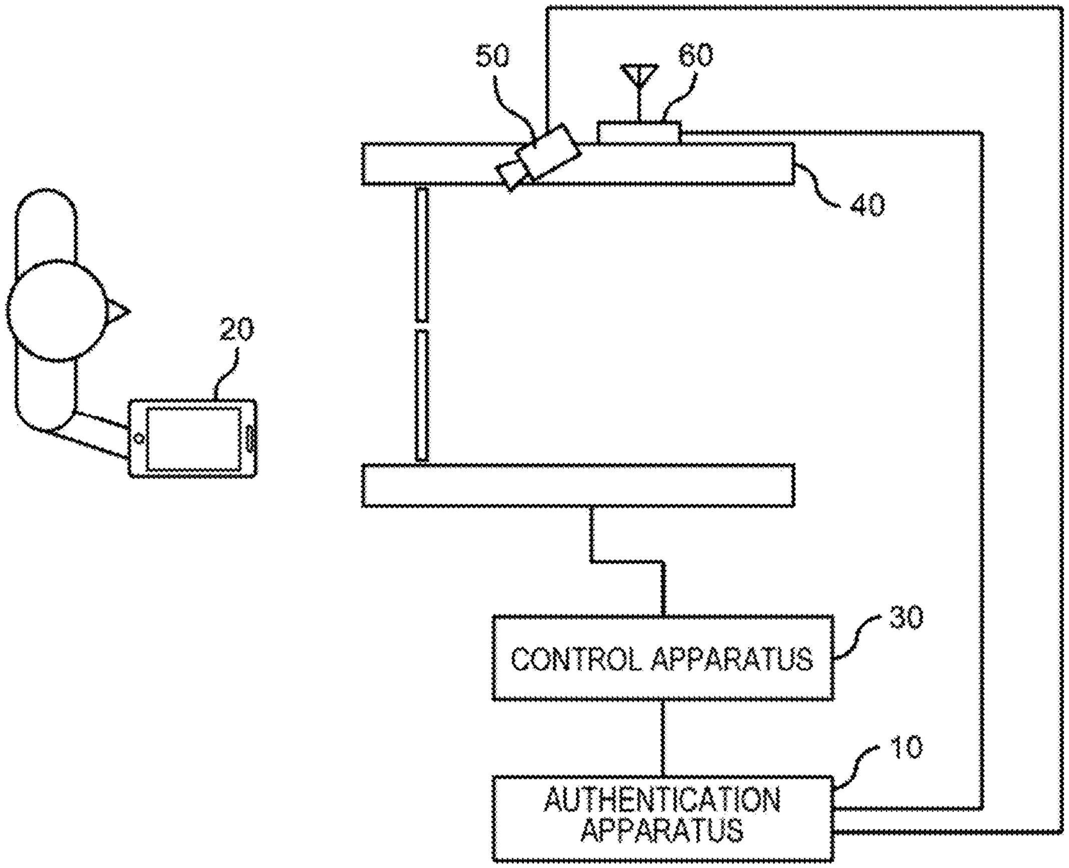
FIG. 1 It is a diagram illustrating a usage environment of an authentication apparatus according to a first example embodiment.

FIG. 1 is a diagram illustrating a usage environment of an authentication apparatus 10 according to the present example embodiment. The authentication apparatus 10 authenticates a target person by using biological information. One example of the biological information is face information, and may be biological information other than the face information, for example, fingerprint information, vein information, or iris information. Further, the biological information may be a combination of a plurality of pieces of the information described above.

The authentication apparatus 10 is used together with a mobile terminal 20, a biological information acquisition apparatus 50, and a communication apparatus 60. The mobile terminal 20 is in the possession of a user. The authentication apparatus 10 includes a function as an electronic identification card, for example, an electronic employee identification card, and previously stores master biological information of a target person. The biological information acquisition apparatus 50 and the communication apparatus 60 are installed in a location where a user should be authenticated, for example, in front of a gate or a door.

The biological information acquisition apparatus 50 is installed in a location where a target person should be authenticated, generates biological information of a target person, and transmits the generated biological information to the authentication apparatus 10. Hereinafter, the biological information is referred to as biological information for authentication. Further, the mobile terminal 20 transmits, via the communication apparatus 60, master biological information to the authentication apparatus 10. For example, the communication apparatus 60 attempts to communicate with the mobile terminal 20 every fixed time, for example, every second. A communicable distance between the mobile terminal 20 and the communication apparatus 60 is, but not limited to, for example, equal to or less than 5 m, preferably, equal to or less than 3 m, and more preferably, equal to or less than 1.5 m. Then, the authentication apparatus 10 executes authentication processing for a target person, by using biological information for authentication generated by the biological information acquisition apparatus 50 and master biological information acquired from the mobile terminal 20.

Further, the authentication apparatus 10 stores, when authentication of biological information for authentication is successful, master biological information used at the time for a certain period, and reuses the stored master biological information.

The mobile terminal 20 may store at least one of target person identification information provided for a target person carrying the mobile terminal 20 and terminal identification information provided for the mobile terminal 20. In this case, the mobile terminal 20 transmits, as necessary, together with the biological information for authentication and the master biological information, at least one of target person identification information and terminal identification information. One example of the target person identification information is a target person ID, for example, an employee ID.

In the example illustrated in the present figure, the authentication apparatus 10 is used further together with a control apparatus 30. The control apparatus 30 executes at least a part of processing for enabling a target person to enter a target area. The control apparatus 30, for example, opens a gate 40 installed at an entrance of a target area. As another example, the control apparatus 30 releases a lock of a door installed at an entrance of a target area. The target area may be a location where a plurality of facilities gather, for example, a theme park, may be a building itself, may be a predetermined floor in a building, or may be a part of a predetermined floor in a building, for example, a predetermined room. Further, the control apparatus 30 may execute, when opening the gate 40 or releasing a lock of a door, processing of notifying a target person of the fact, by lighting a light emitting apparatus installed at the gate 40 or the door, or the like.

A matter in that authentication processing based on the authentication apparatus 10 is successful may be a part of a condition for opening a gate or releasing a lock of a door. As one example, there is a case where, regarding a target area, a person permitted to enter the target area is previously determined. The control apparatus 30 may open a gate or release a lock of a door, when a target person is further confirmed as a person permitted to enter the target area after authentication processing based on the authentication apparatus 10 is successful. The confirmation is executed, for example, by using at least one of target person identification information and terminal identification information.

Note that, at an entrance of a target area, a plurality of gates 40 may be disposed in parallel. In this case, the authentication apparatus 10 and the communication apparatus 60 may be provided for a plurality of gates 40 each. Herein, between neighboring gates 40, a shield member for reducing passing of an electric wave, for example, a shield plate is preferably provided. By doing so, a possibility in that a mobile terminal 20 carried by a target person about to pass through a certain gate 40 erroneously communicates with the communication apparatus 60 provided for a next gate 40 is decreased.

Figure 2:
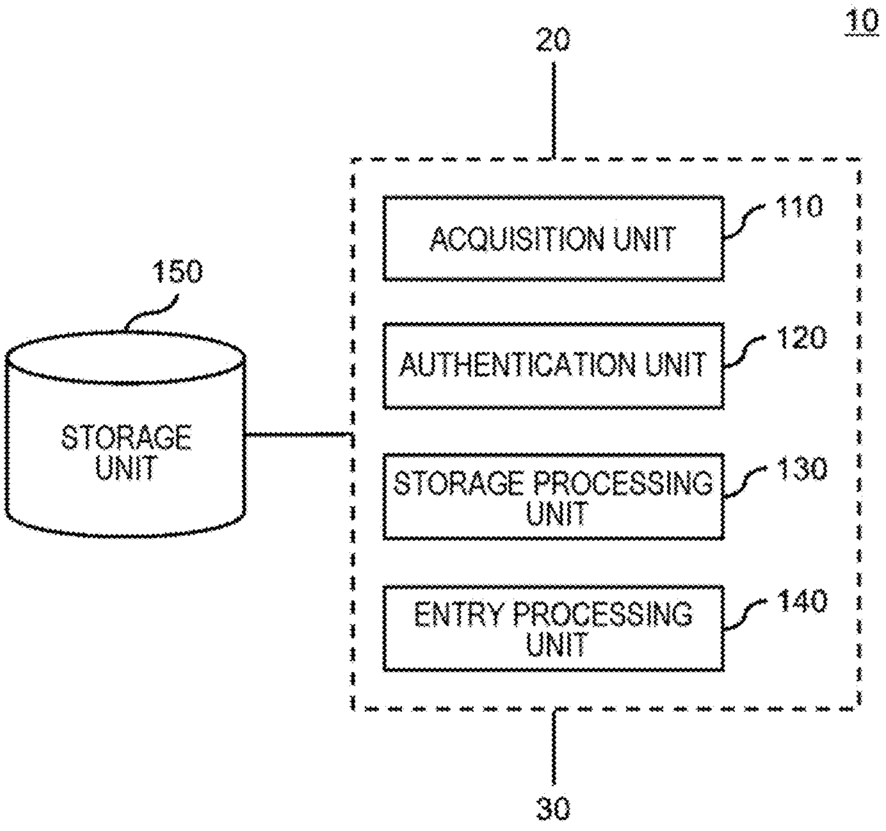
FIG. 2 It is a diagram illustrating one example of a function configuration of the authentication apparatus.

FIG. 2 is a diagram illustrating one example of a function configuration of the authentication apparatus 10. The authentication apparatus 10 includes an acquisition unit 110, an authentication unit 120, a storage processing unit 130, and an entry processing unit 140.

The acquisition unit 110 acquires, via the communication apparatus 60, master biological information from the mobile terminal 20, and also acquires biological information for authentication from the biological information acquisition apparatus 50. Further, the acquisition unit 110 acquires, as necessary, another piece of information from the mobile terminal 20. One example of the another piece of information is at least one of target person identification information and terminal identification information. Hereinafter, the information is referred to as identification information for authentication.

When a plurality of mobile terminals 20 are present at the same time in a communication area of the communication apparatus 60, the plurality of mobile terminals 20 may be communicable with the communication apparatus 60. In this case, the acquisition unit 110 acquires reception intensity at a time when the communication apparatus 60 receives radio being output by the mobile terminal 20, and determines, by using the reception intensity, a mobile terminal 20 to be processed. The acquisition unit 110 determines, for example, a mobile terminal 20 to be processed in descending order of reception intensity.

The authentication unit 120 executes authentication processing for a target person, by using biological information for authentication and master biological information acquired by the acquisition unit 110. The authentication unit 120, for example, computes a degree of matching of biological information for authentication with master biological information, and determines that authentication of the target person is successful when the degree of matching is equal to or more than a reference value. The authentication unit 120 generates, when the authentication is successful, authenticated information indicating this fact.

The storage processing unit 130 causes, when authentication based on the authentication unit 120 is successful, a storage unit 150 to store master biological information used at the time. Further, the storage processing unit 130 invalidates or deletes, from the storage unit 150, master biological information in which a time of being stored in the storage unit 150 is equal to or more than a predetermined time. The storage unit 150 may be a part of the authentication apparatus 10, or may be located outside the authentication apparatus 10. Note that, the storage processing unit 130 may cause the storage unit 150 to store master biological information in association with identification information for authentication acquired together with the master biological information.

A valid time of master biological information stored in the storage unit 150, i.e., the above-described predetermined time is, for example, 24 hours, but may be a length other than 24 hours, for example, 12 hours or eight hours. With regard to the predetermined time, the predetermined time may be determined for each target person, or may be determined for each target person and each target area. As one example, the storage processing unit 130 determines the predetermined time by using schedule information of a target person. The schedule information includes, for example, information indicating a target area to which the target person should go and a day and time of a scheduled stay in the target area. As one example, the schedule information stores a location where a meeting is held and a day and time when the meeting is held. Then, the entry processing unit 140 sets, for each target area, a predetermined time in such a way as to include a day and time of the scheduled stay, and causes the storage unit 150 to store the predetermined time in association with area identification information for each target person.

Master biological information which is stored in the storage unit 150 and is valid is used in authentication processing for biological information for authentication. For details, the acquisition unit 110 acquires, before acquiring master biological information from the mobile terminal 20, biological information for authentication. Then, the authentication unit 120 executes authentication processing for the biological information for authentication with respect to master biological information which is stored in the storage unit 150 and is valid. Then, the acquisition unit 110 acquires master biological information from the mobile terminal 20 when master biological information which is matched with biological information for authentication and is valid is not stored in the storage unit 150.

The entry processing unit 140 executes, when the authentication unit 120 generates authenticated information, at least a part of processing for enabling a target person to enter a target area. The part of processing is appropriately set according to function distribution between the entry processing unit 140 and the control apparatus 30. One example of the part of processing is transmission of authenticated information to the control apparatus 30.

The storage unit 150 further stores, for each target area, at least one of target person identification information of a person permitted to enter the target area and terminal identification information. Further, the storage unit 150 stores another piece of information as necessary.

FIG. 3 is a diagram illustrating a first example of information stored by the storage unit 150. As described above, the storage unit 150 stores, among pieces of master biological information acquired by the acquisition unit 110, a piece of master biological information in which authentication based on the authentication unit 120 is successful. In the example illustrated in the present figure, the storage unit 150 stores the master biological information in association with identification information for authentication acquired together with the master biological information.

In master biological information stored in the storage unit 150, a predetermined time does not lapse from acquisition by the acquisition unit 110. In other words, master biological information in which the predetermined time lapses is erased from the storage unit 150. However, the storage processing unit 130 may cause the storage unit 150 to store, instead of erasing master biological information in which the predetermined time lapses from the storage unit 150, information indicating that the predetermined time lapses, for example, a flag in association with the master biological information.

FIG. 4 is a diagram illustrating a second example of information stored by the storage unit 150. The storage unit 150 stores, as illustrated in the figure, in addition to the information illustrated in FIG. 3, area identification information identifying a target area and authorized identification information in association with each other. The authorized identification information is at least one of target person identification information of a target person permitted to enter the target area and terminal identification information of a mobile terminal 20 used by the target person. In FIG. 4, area identification information is based on a building unit, but the storage unit 150 may further store authorized identification information based on a room unit or a floor unit.

Figure 5:
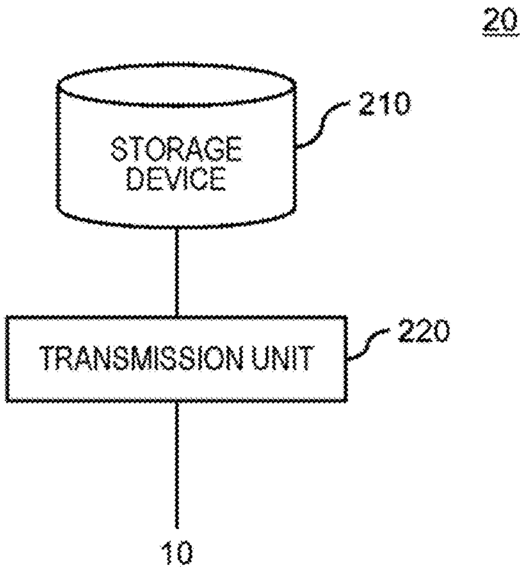
FIG. 5 It is a diagram illustrating one example of a function configuration of a mobile terminal.

FIG. 5 is a diagram illustrating one example of a function configuration of the mobile terminal 20. The mobile terminal 20 includes a storage unit 210 and a transmission unit 220.

The storage unit 210 stores master biological information of a target person using the mobile terminal 20. The storage unit 210 further stores at least one of target person identification information of a target person using the mobile terminal 20 and terminal identification information of the mobile terminal 20 used by the target person, i.e., identification information for authentication.

The transmission unit 220 transmits, to the authentication apparatus 10, master biological information stored by the storage unit 210. At that time, the transmission unit 220 also transmits identification information for authentication as necessary.

Figure 6:
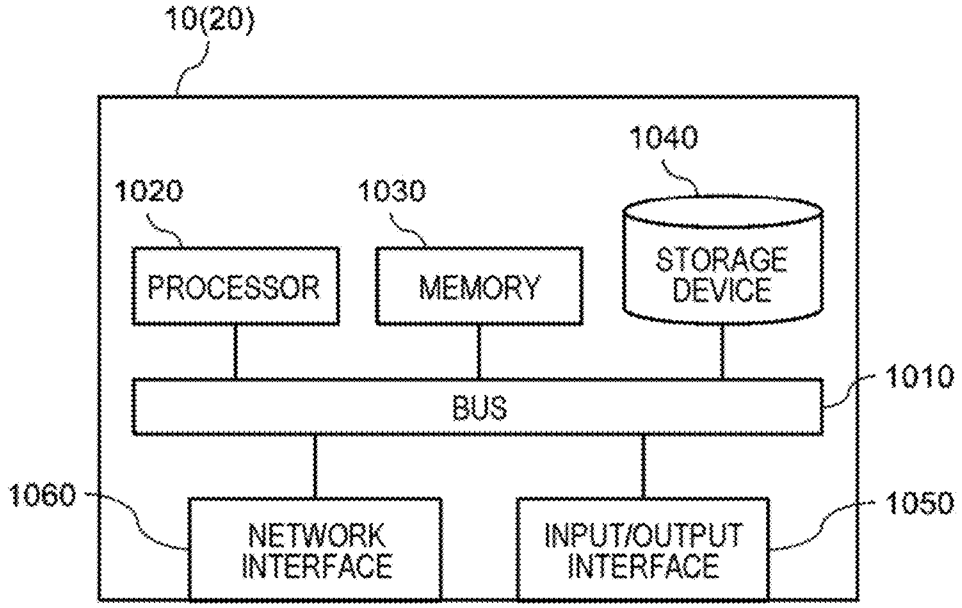
FIG. 6 It is a diagram illustrating a hardware configuration example of the authentication apparatus.

FIG. 6 is a diagram illustrating a hardware configuration example of the authentication apparatus 10. The authentication apparatus 10 includes a bus 1010, a processor 1020, a memory 1030, a storage device 1040, an input/output interface 1050, and a network interface 1060.

The bus 1010 is a data transmission path through which the processor 1020, the memory 1030, the storage device 1040, the input/output interface 1050, and the network interface 1060 transmit/receive data to/from one another. However, a method of mutually connecting the processor 1020 and the like is not limited to bus connection.

The processor 1020 is a processor achieved by a central processing unit (CPU), a graphics processing unit (GPU), or the like.

The memory 1030 is a main storage apparatus achieved by a random access memory (RAM) or the like.

The storage device 1040 is an auxiliary storage apparatus achieved by a hard disk drive (HDD), a solid state drive (SSD), a removable medium such as a memory card, a read only memory (ROM), or the like. The storage device 1040 stores a program module for achieving each function (e.g., the acquisition unit 110, the authentication unit 120, the storage processing unit 130, and the entry processing unit 140) of the authentication apparatus 10. The processor 1020 reads each of the program modules onto the memory 1030 and executes the read program module, and thereby achieves each function relevant to the program module. Further, the storage device 1040 functions also as the storage unit 150.

The input/output interface 1050 is an interface for connecting the authentication apparatus 10 and various types of input/output devices. The input/output interface 1050 includes, for example, a short-range wireless communication module. In this case, the authentication apparatus 10 communicates with the communication apparatus 60 via the input/output interface 1050.

The network interface 1060 is an interface for connecting the authentication apparatus 10 to a network. The network is, for example, a local area network (LAN) or a wide area network (WAN). A method for connection to a network based on the network interface 1060 may be wireless connection, or may be wired connection. The authentication apparatus 10 may communicate with the mobile terminal 20 via the network interface 1060.

Note that, a hardware configuration of the mobile terminal 20 is also similar to the hardware configuration of the authentication apparatus 20 illustrated in FIG. 5. Herein, in a device storing at least master biological information among the storage device 1040 configuring the storage unit 210, preferably, stored information cannot be falsified.

Figure 7:
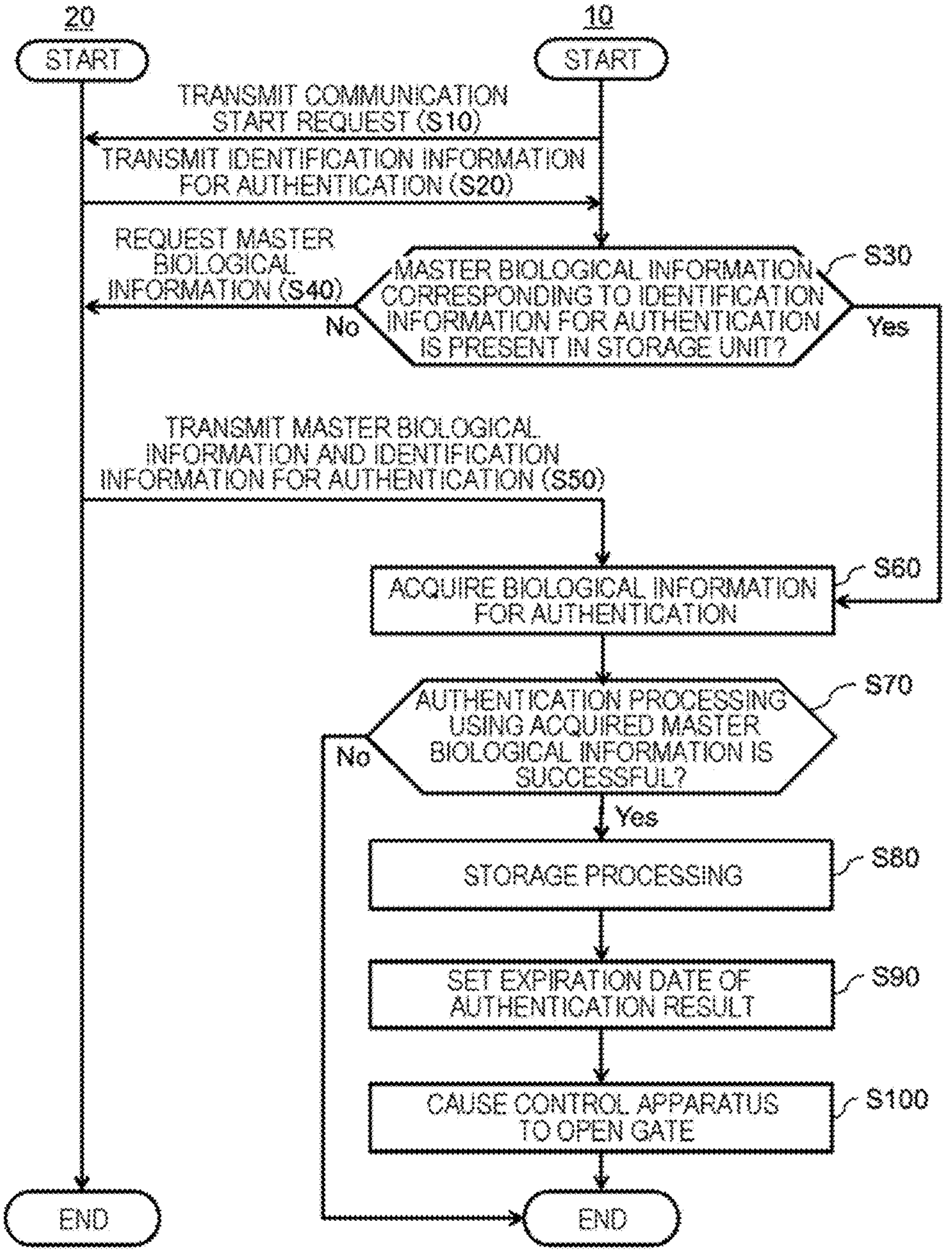
FIG. 7 It is a flowchart illustrating one example of processing executed by the authentication apparatus, together with processing executed by het mobile terminal.

FIG. 7 is a flowchart illustrating one example of processing executed by the authentication apparatus 10, together with processing executed by the mobile terminal 20. The processing illustrated in the present figure is executed when a target person passes through the gate 40 installed at an entrance of a building.

In the example illustrated in the present figure, the control apparatus 30 controls each of the gate 40 installed at an entrance of a building and a lock of a door provided for a room in the building. Then, when a target person passes through the gate 40, authentication at least based on biological information is required. Herein, authentication based on identification information for authentication, i.e., at least one of target person identification information and terminal identification information may be further required.

First, when a target person approaches the gate 40, the authentication apparatus 10 transmits, via the communication apparatus 60, a request for communication start to the mobile terminal 20 (step S10). Then, the communication apparatus 60 acquires, from the mobile terminal 20, identification information for authentication, i.e., at least one of target person identification information and terminal identification information, and transmits the acquired identification information for authentication to the authentication apparatus 10. The acquisition unit 110 of the authentication apparatus 10 acquires the identification information for authentication (step S20).

The acquisition unit 110 of the authentication apparatus 10 confirms whether master biological information corresponding to the identification information for authentication acquired in step S20 is stored in the storage unit 150 (step S30). When the storage unit 150 stores the master biological information (step S30: Yes), the authentication unit 120 reads the master biological information from the storage unit 150. In contrast, when the storage unit 150 does not store the master biological information (step S30: No), the authentication unit 120 requests master biological information from the mobile terminal 20 (step S40). Then, the mobile terminal 20 transmits, to the authentication apparatus 10, the master biological information and the identification information for authentication. The acquisition unit 110 acquires the master biological information (step S50).

Then, the biological information acquisition apparatus 50 acquires the biological information for authentication of the target person, and transmits the acquired biological information for authentication to the authentication apparatus 10. For example, the biological information acquisition apparatus 50 generates, as biological information for authentication, at least one of face information, fingerprint information, vein information, and iris information of the target person, and transmits the generated biological information for authentication to the authentication apparatus 10. The acquisition unit 110 of the authentication apparatus 10 acquires this biological information for authentication (step S60).

Note that, at the gate 40 or in a vicinity of the gate 40, a human detection sensor, for example, an infrared sensor may be provided. In this case, the authentication apparatus 10 may execute, when the human detection sensor detects a person, the processing illustrated in step S60.

Then, the authentication unit 120 of the authentication apparatus 10 executes authentication processing for the biological information for authentication acquired in step S60, by using the master biological information read from the storage unit 150 or the master biological information acquired in step S50 (step S70). The authentication unit 120 generates, when the authentication is successful (step S70: Yes), the above-described authenticated information. Further, the authentication unit 120 causes, when the acquisition unit 110 has acquired the master biological information from the mobile terminal 20, the storage unit 150 to store this master biological information in association with the identification information for authentication acquired in step S20 (step S80).

The entry processing unit 140 sets, when authenticated information is generated (step S70: Yes), an expiration date of the authenticated information, and causes the storage unit 150 to store the expiration date in association with identification information for authentication (step S90). The expiration date of authenticated information is, for example, a predetermined time from generation of authenticated information. The predetermined time can be set, for example, by a manager of a building. As one example, the predetermined time is 24 hours, but may be a value other than 24 hours, for example, 12 hours or eight hours.

Next, the entry processing unit outputs authenticated information to the control apparatus 30. Then, the control apparatus 30 opens the gate 40 (step S100). Thereby, the target person can pass through the gage 40 and enter the building.

Herein, the acquisition unit 110 may acquire area identification information assigned to the building which the target person is about to enter. In this case, the entry processing unit 140 may read, from the storage unit 150, authorized identification information relevant to the area identification information acquired by the acquisition unit 110, and include, in a condition for executing step S100, a fact that the authorized identification information includes the identification information for authentication acquired by the acquisition unit 110.

Note that, there are various methods of acquiring area identification information by the acquisition unit 110. As a first example, the communication apparatus 60 stores area identification information, and transmits the stored area identification information to the authentication apparatus 10, together with information acquired from the mobile terminal 20. As a second example, a target person operates the mobile terminal 20, and transmits area identification information to the authentication apparatus 10.

Figure 8:
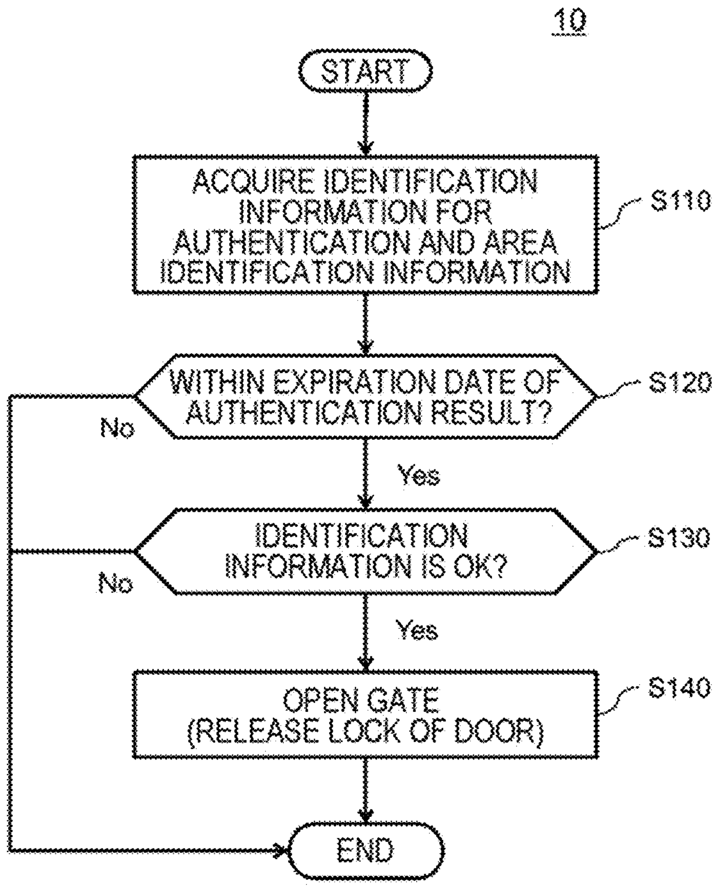
FIG. 8 It is a flowchart illustrating processing executed, after the processing illustrated in FIG. 7 is executed, when a target person enters a predetermined floor or room of the building.

FIG. 8 is processing executed, after the processing illustrated in FIG. 7 is executed, at a time when a target person enters a predetermined floor or room of the building. In the processing, the authentication apparatus 10 does not perform authentication based on biological information, but, instead thereof, performs authentication based on identification information for authentication.

At an entrance of a predetermined floor of a building, a door or a gate is installed. Further, at an entrance of a room of the building, a door is installed. Then, the control apparatus 30 controls opening/closing of the gate or a lock of the door. Further, in a vicinity of the gate or the door, the communication apparatus 60 is provided.

When a target person approaches the gate or the door, the mobile terminal 20 transmits, via the communication apparatus 60, identification information for authentication to the authentication apparatus 10. The acquisition unit 110 of the authentication apparatus 10 acquires the identification information for authentication. At that time, the acquisition unit 110 also acquires area identification information. An acquisition method for the area identification information is as described by using FIG. 7 (step S110).

The authentication unit 120 of the authentication apparatus 10 confirms whether an expiration date relevant to the identification information for authentication acquired in step S110 is stored in the storage unit 150. When the expiration date is stored and the expiration date does not expire (S120: Yes), the authentication unit 120 reads, from the storage unit 150, authorized identification information associated with the area identification information acquired in step S110. Then, the authentication unit 120 confirms whether the read authorized identification information includes the identification information for authentication acquired in step S110 (step S130). When the authorized identification information includes the identification information for authentication (step S130: Yes), the entry processing unit 140 causes the control apparatus 30 to open the gate or release the lock of the door (step S140).

Note that, in step S90 in FIG. 7, the entry processing unit 140 may set, by using schedule information of a target person, an expiration date of authenticated information. The schedule information includes, for example, information indicating a target area to which the target person should go and a day and time of a scheduled stay in the target area. As one example, the schedule information stores a location where a meeting is held and a day and time when the meeting is held. Then, the entry processing unit 140 sets, for each target area, an expiration date in such a way as to include a day and time of the scheduled stay, and causes the storage unit 150 to store the expiration date in association with the area identification information. In this case, the authentication unit 120 acquires and uses, in step S120 in FIG. 8, the expiration date relevant to the area identification information acquired in step S110.

Further, when a target person enters a predetermined floor or room of the building, instead of the processing illustrated in FIG. 8, the processing illustrated in FIG. 7 may be executed. However, in this case, in a vicinity of the gate or the door, the biological information acquisition apparatus 50 is also provided. Further, in both cases where entry is done into a building and entry is done into a predetermined floor or room of the building, the processing illustrated in step S80 may not necessarily be executed.

As described above, according to the present example embodiment, the mobile terminal 20 stores master biological information of a target person. Then, the authentication apparatus 10 acquires, from the mobile terminal 20, the master biological information, and uses the acquired master biological information in authentication processing for the target person. Further, the authentication apparatus 10 stores, for a predetermined time, the master biological information acquired from the mobile terminal 20, and uses the stored master biological information in authentication processing for a target person. Therefore, the number of transmissions of master biological information from the mobile terminal 20 can be reduced. Thereby, a target person does not always need to carry the mobile terminal 20 when being authenticated by the authentication apparatus 10.

Second Example Embodiment

The present example embodiment is similar to the above-described first example embodiment, except the following point. First, a storage unit 210 of a mobile terminal 20 stores certificate information. The certificate information certifies that the mobile terminal 20 is a terminal used together with an authentication apparatus 10. Then, the authentication apparatus 10 sets, as a condition for executing authentication processing or a condition for succeeding in authentication processing, a fact that the certificate information is acquired from the authentication apparatus 10.

Figure 9:
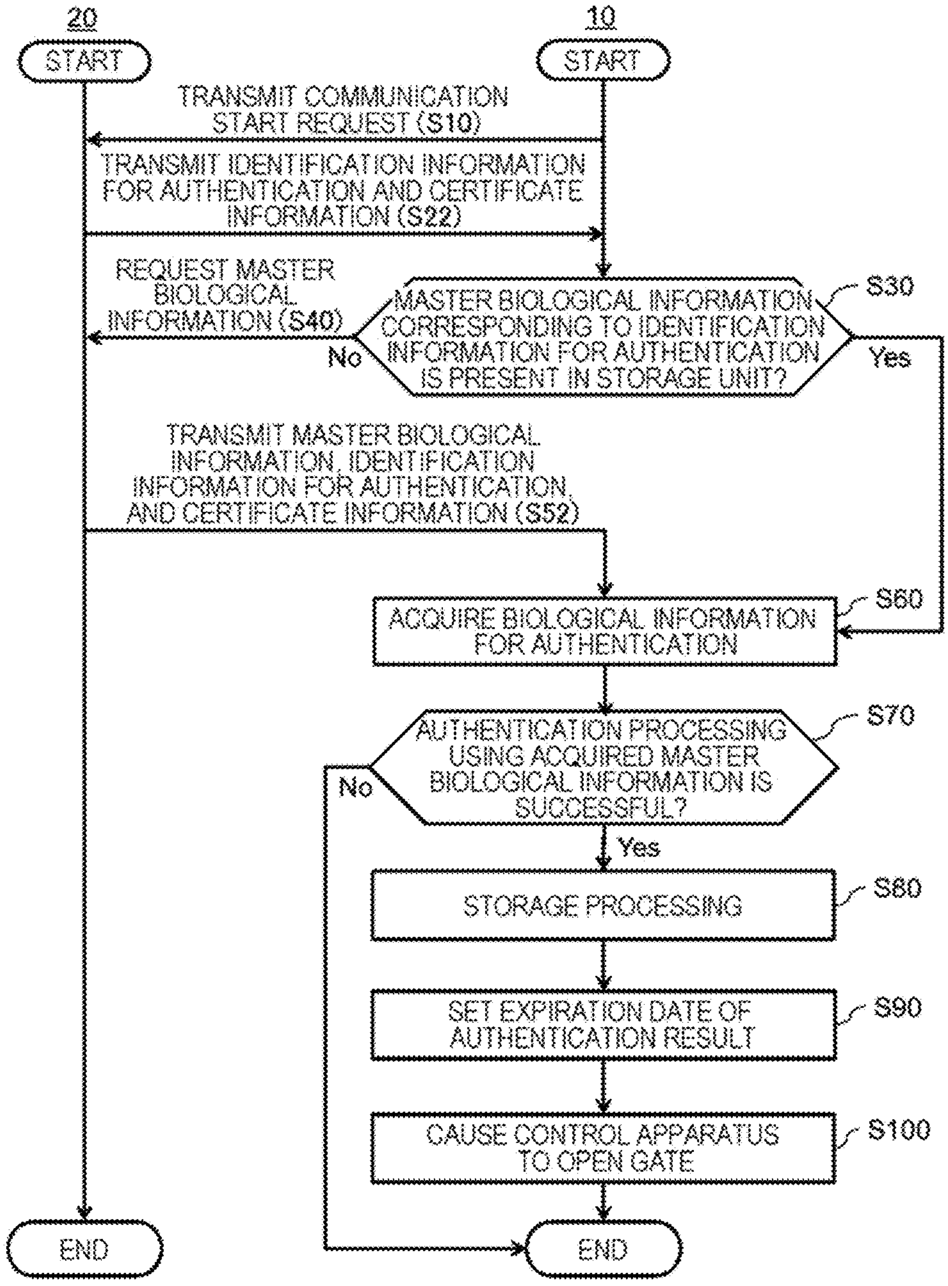
FIG. 9 It is a flowchart illustrating one example of processing executed by an authentication apparatus 10 according to a second example embodiment.

FIG. 9 is a diagram illustrating one example of processing executed by the authentication apparatus 10 according to the present example embodiment, and is relevant to FIG. 7 according to the first example embodiment. Processing illustrated in the present figure is also executed when a target person passes through a gate 40 installed at an entrance of a building.

When a target person approaches the gate 40, the authentication apparatus 10 transmits, via a communication apparatus 60, a request for communication start to the mobile terminal 20 (step S10). Then, the communication apparatus 60 acquires, from the mobile terminal 20, identification information for authentication and certificate information, and transmits the acquired identification information for authentication and certificate information to the authentication apparatus 10 (step S22).

Further, the mobile terminal 20 transmits, when master biological information is requested from the authentication apparatus 10 (step S40), the master biological information, the identification information for authentication, and the certificate information to the authentication apparatus 10 (step S52).

Other pieces of processing (step S30, and steps S60 to S100) are as described by using FIG. 7. However, an authentication unit 120 executes authentication processing when, in step S70, an acquisition unit 110 acquires certificate information from the mobile terminal 20. In other words, when certificate information is not acquired, the authentication unit 120 determines that authentication of a target person fails.

Also, according to the present example embodiment, the authentication apparatus 10 can reduce the number of transmissions of master biological information from a mobile terminal 20. Further, the authentication unit 120 does not execute authentication processing when acquiring no certificate information from the mobile terminal 20. Therefore, a probability in that a person who does not carry a qualified mobile terminal 20 erroneously enters a target area is reduced.

While with reference to the accompanying drawings, the example embodiments according to the present invention have been described, the example embodiments are illustrative of the present invention and various configurations other than the above-described configurations are employable.

Further, in a plurality of flowcharts used in the above-described description, a plurality of steps (pieces of processing) are described in order, but an execution order of steps to be executed according to each example embodiment is not limited to the described order. According to each example embodiment, an order of illustrated steps can be modified within an extent that there is no harm in context. Further, the above-described example embodiments can be combined within an extent that there is no conflict in content.

The whole or part of the example embodiments described above can be described as, but not limited to, the following supplementary notes.

1. An authentication apparatus including:
   - an acquisition unit that acquires master biological information of a target person from a mobile terminal, and acquires biological information for authentication being biological information of the target person generated by a biological information generation apparatus installed at an entrance of a target area;
   - an authentication unit that executes authentication processing for the target person, by using the biological information for authentication and the master biological information;
   - an entry processing unit that executes, when the authentication processing is successful, at least a part of processing for enabling the target person to enter a target area; and
   - a storage processing unit that causes, when the authentication processing is successful, a storage unit to store the master biological information, and also invalidates or deletes, from the storage unit, the master biological information in which a time of being stored in the storage unit is equal to or more than a predetermined time, wherein
   - the acquisition unit acquires, before acquiring the master biological information from the mobile terminal, the biological information for authentication,
   - the authentication unit executes, for the valid master biological information stored in the storage unit, authentication processing for the biological information for authentication, and the acquisition unit acquires the master biological information from the mobile terminal when the master biological information which is matched with the biological information for authentication and is valid is not stored in the storage unit.

2. The authentication apparatus according to supplementary note 1, wherein the acquisition unit acquires schedule information indicating a schedule of the target person, and the storage processing unit sets, by using the schedule information, the predetermined time for each of the target areas.

3. The authentication apparatus according to supplementary note 1 or 2, wherein the target area is previously associated with authorized identification information identifying at least one of an authorized person being the target person holding authority to enter the target area and an authorized terminal being the mobile terminal carried by the authorized person, the acquisition unit acquires, from the mobile terminal, identification information for authentication identifying at least one of the target person and the mobile terminal, and the entry processing unit executes at least the part of the processing when the identification information for authentication is included in the authorized identification information.

4. The authentication apparatus according to any one of supplementary notes 1 to 3, wherein the acquisition unit acquires, from the mobile terminal, identification information for authentication identifying at least one of the target person and the mobile terminal, the storage processing unit causes the storage unit to store the master biological information and the identification information for authentication acquired by the acquisition unit in association with each other, the acquisition unit acquires, before acquiring the master biological information from the mobile terminal, the biological information for authentication and the identification information for authentication, the authentication unit determines the master biological information associated with the identification information for authentication acquired by the acquisition unit in the storage unit, and executes the authentication processing by using the master biological information, and the acquisition unit acquires, when the master biological information associated with the identification information for authentication is not present in the storage unit, the master biological information from the mobile terminal, and executes the authentication processing.

5. The authentication apparatus according to any one of supplementary notes 1 to 4, wherein the entry processing unit outputs authenticated information indicating that the authentication processing is successful to a control unit that controls opening/closing of a gate installed at an entrance of the target area or a lock of a door installed at the entrance.

6. The authentication apparatus according to any one of supplementary notes 1 to 5, wherein the acquisition unit acquires the master biological information from the mobile terminal via a wireless communication apparatus installed at the entrance, and a communicable distance of the wireless communication apparatus is equal to or less than 5 m.

7. The authentication apparatus according to supplementary note 6, wherein the acquisition unit acquires reception intensity at a time when the wireless communication apparatus receives radio being output by the mobile terminal, and determines, when a plurality of the mobile terminals and the wireless communication apparatus are communicable, the mobile terminal to be processed by using the reception intensity.

8. An authentication method including, by a computer executing:

acquisition processing of acquiring master biological information of a target person from a mobile terminal, and acquiring biological information for authentication being biological information of the target person generated by a biological information generation apparatus installed at an entrance of a target area;

authentication processing of executing authentication of the target person, by using the biological information for authentication and the master biological information;

entry processing of executing, when the authentication processing is successful, at least a part of processing for enabling the target person to enter a target area; and storage processing of causing, when the authentication processing is successful, a storage unit to store the master biological information, and also invalidating or deleting, from the storage unit, the master biological information in which a time of being stored in the storage unit is equal to or more than a predetermined time, the authentication method further including, by the computer:

in the acquisition processing, acquiring, before acquiring the master biological information from the mobile terminal, the biological information for authentication;

in the authentication processing, authenticating, for the valid master biological information stored in the storage unit, the biological information for authentication; and in the acquisition processing, acquiring the master biological information from the mobile terminal when the master biological information which is matched with the biological information for authentication and is valid is not stored in the storage unit.

9. The authentication method according to supplementary note 8, further including, by the computer:

in the acquisition processing, acquiring schedule information indicating a schedule of the target person; and in the storage processing, setting, by using the schedule information, the predetermined time for each of the target areas.

10. The authentication method according to supplementary note 8 or 9, wherein the target area is previously associated with authorized identification information identifying at least one of an authorized person being the target person holding authority to enter the target area and an authorized terminal being the mobile terminal carried by the authorized person, the authentication method further including, by the computer:

in the acquisition processing, acquiring, from the mobile terminal, identification information for authentication identifying at least one of the target person and the mobile terminal; and in the entry processing, executing at least the part of the processing when the identification information for authentication is included in the authorized identification information.

11. The authentication method according to any one of supplementary notes 8 to 10, further including, by the computer:

in the acquisition processing, acquiring, from the mobile terminal, identification information for authentication identifying at least one of the target person and the mobile terminal;

in the storage processing, causing the storage unit to store the master biological information and the identification information for authentication acquired by the acquisition processing in association with each other;

in the acquisition processing, acquiring, before acquiring the master biological information from the mobile terminal, the biological information for authentication and the identification information for authentication;

in the authentication processing, determining the master biological information associated with the identification information for authentication acquired in the acquisition processing in the storage unit, and executing the authentication processing by using the master biological information; and in the acquisition processing, acquiring, when the master biological information associated with the identification information for authentication is not present in the storage unit, the master biological information from the mobile terminal, and executing the authentication processing.

12. The authentication method according to any one of supplementary notes 8 to 11, further including, by the computer, in the entry processing, outputting authenticated information indicating that the authentication processing is successful to a control unit that controls opening/closing of a gate installed at an entrance of the target area or a lock of a door installed at the entrance.

13. The authentication method according to any one of supplementary notes 8 to 12, further including, by the computer, in the acquisition processing, acquiring the master biological information from the mobile terminal via a wireless communication apparatus installed at the entrance, wherein a communicable distance of the wireless communication apparatus is equal to or less than 5 m.

14. The authentication method according to supplementary notes 13, further including, by the computer, in the acquisition unit:

acquiring reception intensity at a time when the wireless communication apparatus receives radio being output by the mobile terminal; and determining, when a plurality of the mobile terminals and the wireless communication apparatus are communicable, the mobile terminal to be processed by using the reception intensity.

15. A program for causing a computer to include:

an acquisition function of acquiring master biological information of a target person from a mobile terminal, and acquiring biological information for authentication being biological information of the target person generated by a biological information generation apparatus installed at an entrance of a target area;

an authentication function of executing authentication processing for the target person, by using the biological information for authentication and the master biological information;

an entry processing function of executing, when the authentication processing is successful, at least a part of processing for enabling the target person to enter a target area; and a storage processing function of causing, when the authentication processing is successful, a storage unit to store the master biological information, and also invalidating or deleting, from the storage unit, the master biological information in which a time of being stored in the storage unit is equal to or more than a predetermined time, wherein the acquisition function acquires, before acquiring the master biological information from the mobile terminal, the biological information for authentication, the authentication function executes, for the valid master biological information stored in the storage unit, authentication processing for the biological information for authentication, and the acquisition function acquires the master biological information from the mobile terminal when the master biological information which is matched with the biological information for authentication and is valid is not stored in the storage unit.

16. The program according to supplementary note 15, wherein the acquisition function acquires schedule information indicating a schedule of the target person, and the storage processing function sets, by using the schedule information, the predetermined time for each of the target areas.

17. The program according to supplementary note 15 or 16, wherein the target area is previously associated with authorized identification information identifying at least one of an authorized person being the target person holding authority to enter the target area and an authorized terminal being the mobile terminal carried by the authorized person, the acquisition function acquires, from the mobile terminal, identification information for authentication identifying at least one of the target person and the mobile terminal, and the entry processing function executes at least the part of the processing when the identification information for authentication is included in the authorized identification information.

18. The program according to any one of supplementary notes 15 to 17, wherein the acquisition function acquires, from the mobile terminal, identification information for authentication identifying at least one of the target person and the mobile terminal, the storage processing function causes the storage unit to store the master biological information and the identification information for authentication acquired by the acquisition function in association with each other, the acquisition function acquires, before acquiring the master biological information from the mobile terminal, the biological information for authentication and the identification information for authentication, the authentication function determines the master biological information associated with the identification information for authentication acquired by the acquisition function in the storage unit, and executes the authentication processing by using the master biological information, and the acquisition function acquires, when the master biological information associated with the identification information for authentication is not present in the storage unit, the master biological information from the mobile terminal, and executes the authentication processing.

19. The program according to any one of supplementary notes 15 to 18, wherein the entry processing function outputs authenticated information indicating that the authentication processing is successful to a control unit that controls opening/closing of a gate installed at an entrance of the target area or a lock of a door installed at the entrance.

20. The program according to any one of supplementary notes 15 to 19, wherein the acquisition function acquires the master biological information from the mobile terminal via a wireless communication apparatus installed at the entrance, and a communicable distance of the wireless communication apparatus is equal to or less than 5 m.

21. The program according to supplementary note 20, wherein the acquisition function acquires reception intensity at a time when the wireless communication apparatus receives radio being output by the mobile terminal, and determines, when a plurality of the mobile terminals and the wireless communication apparatus are communicable, the mobile terminal to be processed by using the reception intensity.

REFERENCE SIGNS LIST

10 Authentication apparatus
20 Mobile terminal
30 Control apparatus
40 Gate
50 Biological information acquisition apparatus
60 Communication apparatus
110 Acquisition unit
120 Authentication unit
130 Storage processing unit
140 Entry processing unit
150 Storage unit
210 Storage unit
220 Transmission unit

What is claimed is:

1. An authentication apparatus comprising:

at least one memory storing instructions; and at least one processor configured to execute the instructions to:

acquire master biological information of a target person from a mobile terminal, and acquire biological information for authentication being biological information of the target person generated by a biological information generation apparatus installed at an entrance of a target area;

execute authentication processing for the target person, by using the biological information for authentication and the master biological information;

execute, in response to the authentication processing being successful, at least a part of processing for enabling the target person to enter a target area;

cause, in response to the authentication processing being successful, a storage unit to store the master biological information, and also invalidate or delete, from the storage unit, the master biological information in which a time of being stored in the storage unit is equal to or more than a predetermined time;

acquire, before acquiring the master biological information from the mobile terminal, the biological information for authentication;

execute, for the master biological information which is valid and stored in the storage unit, authentication processing for the biological information for authentication; and acquire the master biological information from the mobile terminal in response to the master biological information which is valid and matched with the biological information for authentication not being stored in the storage unit.

2. The authentication apparatus according to claim 1, wherein the at least one processor is further configured to execute the instructions to:

acquire schedule information indicating a schedule of the target person; and set, by using the schedule information, the predetermined time for each of a plurality of target areas.

3. The authentication apparatus according to claim 1, wherein the target area is previously associated with authorized identification information identifying at least one of an authorized person being the target person holding authority to enter the target area and an authorized terminal being the mobile terminal carried by the authorized person, the at least one processor is further configured to execute the instructions to:

acquire, from the mobile terminal, identification information for authentication identifying at least one of the target person and the mobile terminal; and execute at least the part of the processing in response to the identification information for authentication being included in the authorized identification information.

4. The authentication apparatus according to claim 1, wherein the at least one processor is further configured to execute the instructions to:

acquire, from the mobile terminal, identification information for authentication identifying at least one of the target person and the mobile terminal;

cause the storage unit to store the master biological information and identification information for authentication acquired by the acquisition unit in association with each other;

acquire, before acquiring the master biological information from the mobile terminal, the biological information for authentication and the identification information for authentication;

determine the master biological information associated with the identification information for authentication acquired by the acquisition unit in the storage unit, and execute the authentication processing by using the master biological information; and acquire, in response to the master biological information associated with the identification information for authentication not being present in the storage unit, the master biological information from the mobile terminal, and execute the authentication processing.

5. The authentication apparatus according to claim 1, wherein the at least one processor is further configured to execute the instructions to output authenticated information indicating that the authentication processing is successful to a control unit that controls opening/closing of a gate installed at an entrance of the target area or a lock of a door installed at the entrance.

6. The authentication apparatus according to claim 1, wherein the at least one processor is further configured to execute the instructions to acquire the master biological information from the mobile terminal via a wireless communication apparatus installed at the entrance, and a communicable distance of the wireless communication apparatus is equal to or less than 5 m.

7. The authentication apparatus according to claim 6, wherein the at least one processor is further configured to execute the instructions to:

acquire reception intensity at a time in response to the wireless communication apparatus receiving radio being output by the mobile terminal; and determine, in response to a plurality of mobile terminals and the wireless communication apparatus being communicable, a chosen mobile terminal to be processed by using the reception intensity.

8. An authentication method, executed by a computer, comprising:

acquiring master biological information of a target person from a mobile terminal, and acquiring biological information for authentication being biological information of the target person generated by a biological information generation apparatus installed at an entrance of a target area;

authentication processing of executing authentication processing for the target person, by using the biological information for authentication and the master biological information;

executing, in response to the authentication processing being successful, at least a part of processing for enabling the target person to enter a target area; and causing, in response to the authentication processing being successful, a storage unit to store the master biological information, and also invalidating or deleting, from the storage unit, the master biological information in which a time of being stored in the storage unit is equal to or more than a predetermined time, the authentication method further comprising, by the computer:

in the acquiring, acquiring, before acquiring the master biological information from the mobile terminal, the biological information for authentication;

in the executing authentication-processing, authenticating, for the master biological information which is valid and stored in the storage unit, the biological information for authentication; and in the acquiring, acquiring the master biological information from the mobile terminal in response to the master biological information which is valid and matched with the biological information for authentication not being stored in the storage unit.

9. A non-transitory computer-readable storage medium storing a program for causing a computer to execute a method comprising:

acquiring master biological information of a target person from a mobile terminal, and acquiring biological information for authentication being biological information of the target person generated by a biological information generation apparatus installed at an entrance of a target area;

executing authentication processing for the target person, by using the biological information for authentication and the master biological information;

executing, in response to the authentication processing being successful, at least a part of processing for enabling the target person to enter a target area; and causing, in response to the authentication processing being successful, a storage unit to store the master biological information, and also invalidating or deleting, from the storage unit, the master biological information in which a time of being stored in the storage unit is equal to or more than a predetermined time, wherein:

in the acquiring, before acquiring the master biological information from the mobile terminal, the biological information for authentication, in the executing authentication processing, executing, for the master biological information which is valid and stored in the storage unit, authentication processing for the biological information for authentication, and in the acquiring, acquiring the master biological information from the mobile terminal in response to the master biological information which is valid and matched with the biological information for authentication not being stored in the storage unit.

* * * * *